United States Patent
Yoo et al.

(10) Patent No.: US 9,358,978 B2
(45) Date of Patent: Jun. 7, 2016

(54) VEHICLE SPEED CONTROL APPARATUS AND METHOD USING AN IMAGE

(71) Applicant: Hyundai Motor Company, Seoul (KR)

(72) Inventors: Byung Yong Yoo, Gyeonggi-do (KR); Young Chul Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 174 days.

(21) Appl. No.: 14/464,160

(22) Filed: Aug. 20, 2014

(65) Prior Publication Data

US 2015/0329114 A1 Nov. 19, 2015

(30) Foreign Application Priority Data

May 15, 2014 (KR) .................... 10-2014-0058274

(51) Int. Cl.
| | |
|---|---|
| *B60W 30/14* | (2006.01) |
| *B60K 31/00* | (2006.01) |
| *B60W 30/16* | (2012.01) |
| *B60W 40/06* | (2012.01) |
| *B60W 40/105* | (2012.01) |

(52) U.S. Cl.
CPC ............ *B60W 30/14* (2013.01); *B60K 31/0008* (2013.01); *B60W 30/143* (2013.01); *B60W 30/16* (2013.01); *B60W 40/06* (2013.01); *B60W 40/105* (2013.01)

(58) Field of Classification Search
CPC .. B60K 31/0008; B60W 30/16; G05D 1/0246
See application file for complete search history.

(56) References Cited

U.S. PATENT DOCUMENTS

| | | | | |
|---|---|---|---|---|
| 5,612,686 A | * | 3/1997 | Takano | B60Q 9/008 180/169 |
| 5,901,806 A | * | 5/1999 | Takahashi | B60K 31/0008 180/167 |
| 8,068,135 B2 | * | 11/2011 | Kim | G08G 1/166 348/148 |
| 2002/0095246 A1 | * | 7/2002 | Kawazoe | G05D 1/0246 701/1 |
| 2006/0207818 A1 | * | 9/2006 | Fujioka | B60T 7/22 180/167 |
| 2009/0009603 A1 | * | 1/2009 | Kim | G08G 1/166 348/148 |
| 2009/0093927 A1 | * | 4/2009 | Mueller-Schneiders | B60R 16/0232 701/36 |
| 2010/0259609 A1 | * | 10/2010 | Takahashi | G06K 9/72 348/135 |
| 2012/0277955 A1 | * | 11/2012 | Irie | B60W 30/146 701/41 |
| 2012/0300072 A1 | * | 11/2012 | Kim | B60R 1/00 348/148 |

FOREIGN PATENT DOCUMENTS

| | | |
|---|---|---|
| JP | 2011-005920 A | 1/2011 |
| KR | 10-1998-0083930 A | 12/1998 |
| KR | 20120021445 A | 3/2012 |
| KR | 10-2012-0126143 A | 11/2012 |
| KR | 20130045658 A | 5/2013 |

* cited by examiner

*Primary Examiner* — Thomas G Black
*Assistant Examiner* — Peter D Nolan
(74) *Attorney, Agent, or Firm* — Mintz Levin Cohn Ferris Glovsky and Popeo, P.C.; Peter F. Corless

(57) ABSTRACT

A vehicle speed control apparatus is provided. In particular, a storage configured to store a table (hereinafter, referred to an area table) recording an area corresponding to a speed of a vehicle and a condition of a road; an imaging device configured to take a front image of the vehicle; an image processor configured to calculate an area of a shape made by a driving lane of the vehicle and a preceding vehicle in the driving lane from the front image of the vehicle taken by the imaging device; a road information collector configured to collect condition information of the road; and a controller configured to set a speed corresponding to the condition information collected by the road information collector and the area calculated by the image processor as a driving speed of the vehicle, based on the area table.

16 Claims, 5 Drawing Sheets

VEHICLE SPEED CONTROL APPARATUS AND METHOD USING AN IMAGE

CROSS-REFERENCE TO RELATED APPLICATION

This application is based on and claims priority from Korean Patent Application No. 10-2014-0058274, filed on May 15, 2014 in the Korean Intellectual Property Office, the disclosure of which is incorporated herein in its entirety by reference.

BACKGROUND OF THE INVENTION

1. Field of the Invention

The present invention relates to a vehicle speed control apparatus and method using an image, and more particularly, to a technology for adjusting a distance from a preceding vehicle by using a front image in SCC (Smart Cruise Control) system.

2. Description of the Prior Art

In general, SCC (Smart Cruise Control) system provides a cruise function which enables a vehicle to automatically drive at a preset speed while maintaining a constant distance from a preceding vehicle using a radar sensor mounted on the front of the vehicle, or speed limitation function which controls a speed of a vehicle not to exceed a preset speed when a preceding vehicle does not exist.

Such SCC system provides the driver with the ability to not have to continually manipulate an accelerator. Additionally, the vehicle can be operated more safely by preventing a vehicle from driving above a preset speed. As such, these SCC systems are very beneficial to drivers.

A conventional SCC radar system, however, can greatly increase the overall cost of the vehicle for the consumer due to the system's expensive radar sensor.

As such, a more cost effective means for implementing these SCC functions in a vehicle is needed.

SUMMARY OF THE INVENTION

To solve the above problems of the prior art, the object of the present invention is to provide a vehicle speed control apparatus and method using an image, which performs an SCC function based on the front image of a vehicle taken by a monocular camera installed in the front of the vehicle.

The object of the present invention is not limited to the above-mentioned object, and, not mentioned, other objects and advantages of the present invention can be understood by the following description, and they will become apparent by embodiments of the present invention. Also, it will be seen that the objects and advantages of the present invention can be easily realized by means described in the claims and combination thereof.

To achieve the above object, according to the present invention, the vehicle speed control apparatus using an image comprises a storage device configured to store a table (hereinafter, referred to as an area table) recording an area corresponding to a speed of a vehicle and a condition of a road; an imaging device configured to take an image of an area in front of the vehicle; an image processor configured to calculate an area of a shape made by a driving lane of the vehicle and a preceding vehicle in the driving lane from the image of the area in front of the vehicle taken by the imaging device; a road information collector configured to collect condition information of the road; and a controller configured to set a speed corresponding to the condition information collected by the road information collector and the area calculated by the image processor as a driving speed of the vehicle, based on the area table.

Further, to achieve the above object, according to the present invention, the vehicle speed control method comprises steps of storing a table (hereinafter, referred to an area table) recording an area corresponding to a speed of a vehicle and a condition of a road by a storage; imaging an image of an area in front of the vehicle by an imaging device; calculating an area of a shape made by a driving lane of the vehicle and a preceding vehicle in the driving lane from the image in front of the vehicle taken by the imaging device, by an image processor; collecting condition information of the road by a road information collector; and setting a speed corresponding to the collected condition information of the road and the calculated area as a driving speed of the vehicle, based on the area table by a controller.

The invention as described above, thus does not require an expensive radar sensor to perform SCC function based on the image of an area in front of a vehicle taken by a monocular camera.

Also, the SCC function can be performed with low computational complexity, by recognizing the driving lane of its vehicle from the image of the area in front of the vehicle, recognizing the preceding vehicle in the driving lane, and after calculating the area of the shape consisting of the driving lane and the preceding vehicle, performing SCC function based on the table recording the area according to the speed of the vehicle, the degree of slope and a curvature of the road at the vehicle present location.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

The foregoing objects, features and advantages will be more apparent through the detail description as below with reference to the accompanying drawings, and thus the those skilled in the art can be easily embody the technical spirit of the present invention. Further, in the following description of the present invention, if it is determined that the detailed description for the known art related to the present invention unnecessarily obscures the gist of the present invention, the detailed description thereof will be omitted. Hereinafter, with reference to the accompanying drawings, preferred embodiments of the present invention will be described in detail.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles, fuel cell vehicles, and other alternative fuel vehicles (e.g. fuels derived from resources other than petroleum).

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
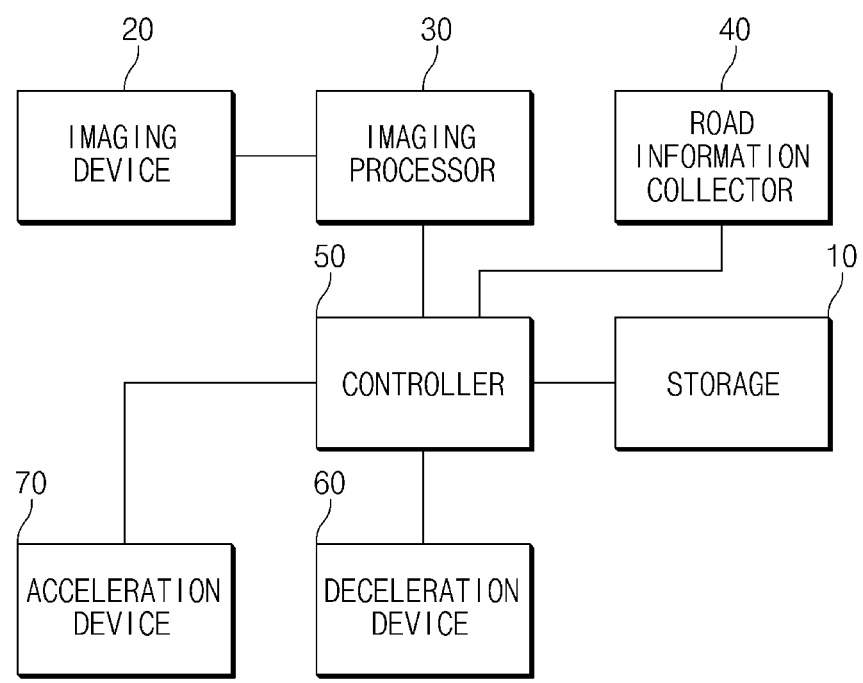
FIG. 1 is a configuration diagram of an exemplary embodiment for a vehicle speed control apparatus using an image according to the present invention.

FIG. 1 is a configuration diagram of an embodiment for a vehicle speed control apparatus using an image according to the present invention. As shown in FIG. 1, a vehicle speed control apparatus according to the present invention includes storage device 10, an imaging device 20, an image processor 30, a road information collector 40, and controller 50.

Looking at each of the above components, first, the storage device 10 stores the table recording the value (the area) corresponding to the speed of a vehicle and the road condition (slope, curvature, etc.). Hereinafter, the case which the speed of the vehicle is 60~70 kph (Table 1), and the case which the speed of the vehicle is 90~100 kph (Table 2) are described as an example, but the storage device 10 stores a table for each speed range.

TABLE 1

| 60~70 kph | | Curvature of road | | |
|---|---|---|---|---|
| | | Straight | Below threshold | Above threshold |
| Slope of road | Ascent | 110 | 130 | 140 |
| | Horizontal | 100 | 120 | 150 |
| | descent | 130 | 150 | 170 |

Here, the slope of a road is classified into an ascent, a horizontal and a descent, and the curvature of a road is classified into a straight, the curvature below a threshold, and the curvature above a threshold. In one example, if the slope of the road is above 5°, it is recognized as an ascent, if the slope of the road is below 5° and above −5°, it is recognized as a flatland, and if the slope of the road is below −5°, it is recognized as a descent.

The above [Table 1] shows the area corresponding to the slope and the curvature of the road if the speed of the vehicle is 60~70 kph. In one example, if the slope of the road is a horizontal and the curvature is a straight, the area is 100. At this time, in the above condition, the current speed of the vehicle should be maintained if the area calculated by the image processor 30 is 100, the vehicle should be decelerated if the area is below 100, and the vehicle should be accelerated if the area is above 100. Here, the acceleration is performed if the current speed of the vehicle is blow the pre-set vehicle speed (SCC user set speed limit).

TABLE 2

| 90~100 kph | | Curvature of road | | |
|---|---|---|---|---|
| | | Straight | Below threshold | Above threshold |
| Slope of road | Ascent | 140 | 155 | 165 |
| | Horizontal | 130 | 150 | 180 |
| | descent | 155 | 170 | 210 |

Looking at the above [Table 2], in the same conditions except for the speed of the vehicle, it can be seen that the value is larger than [Table 1]. That is, because the speed of the vehicle increases, as the area is enlarged. This means that the distance (spacing distance) from the preceding vehicle should be extended as the speed of the vehicle increases. This is related to a braking distance.

In the aforementioned [Table 1] and [Table 2], specific values have been described as an example, but a specific range may be set according to the designer's preference. For example, if the slope of the road is a horizontal and the curvature of the road is a straight in [Table 2], although the area is set to 130 in the exemplary embodiment of the present invention, it may be set to 125~135.

Next, the imaging device 20 may be embodied as a monocular camera, and may be mounted in the center of the vehicle (as an example, a rearview minor). This imaging device 20 takes an image of an area in front of the vehicle. At this time, because the position of the imaging device 20 affects the area of the aforementioned [Table 1] and [Table 2], the imaging device 20 should be mounted in an accurate position. Of course, it is assumed that the vehicle is same model for each of these instances.

Figure 2A:
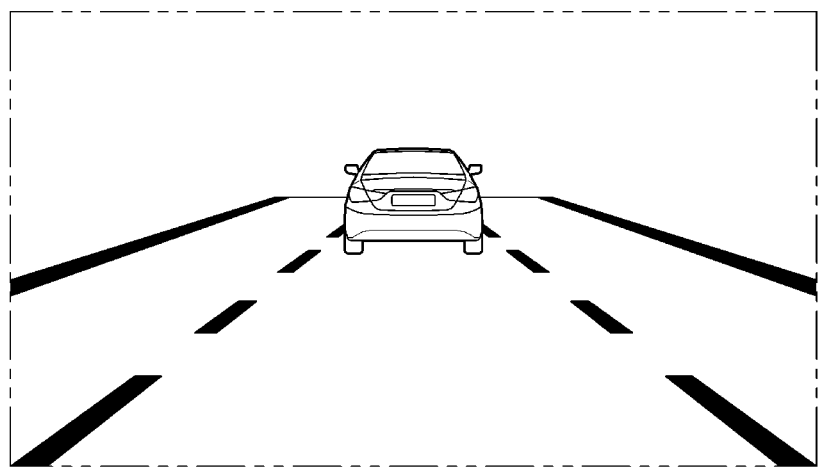
FIG. 2a is an exemplary diagram for a front image of a vehicle taken by an imaging device.

Also, the imaging device 20 can take the image of the area in front of the vehicle as shown in FIG. 2a.

Next, the image processor 30 detects the driving lane of the vehicle in which it is installed from the image of the area in front of the vehicle taken by the imaging device 20, detects the preceding vehicle on the detected driving lane, and calculates the area of the shape made by the driving lane and the preceding vehicle.

Figure 2B:
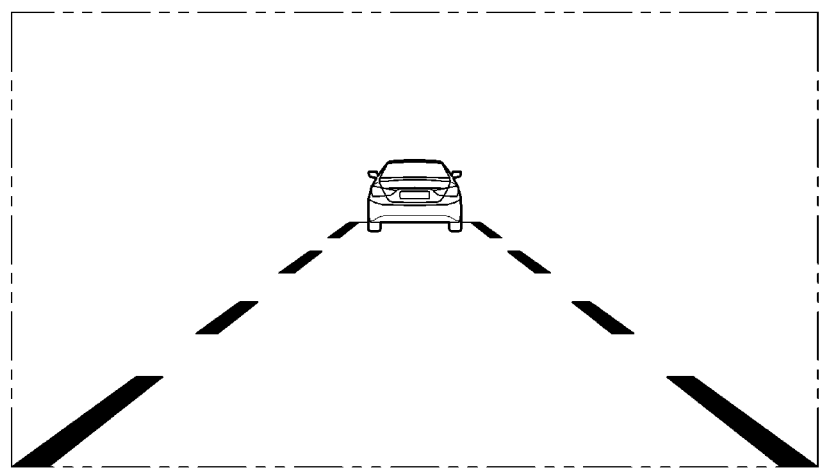
FIG. 2b is an exemplary diagram for an area of a shape calculated by an image processor

That is, the image processor 30 calculates the area of the trapezoid as shown in FIG. 2b. At this time, the left side of the trapezoid represents the left lane line of the driving lane, and right side of the trapezoid represents the right lane line of the driving lane. In addition, the upper side of the trapezoid represents the line meeting the preceding vehicle and the driving lane (a tangent line), the lower side of the trapezoid is fixed as a the bottom of the taken front image (a reference line)

Next, the road information collector 40 collects the condition information of the road (e.g., a slope, a curvature, etc.). At this time, the road information collector 40 can collect the condition information of the road by interworking with the navigation system mounted on the vehicle or via a telematics server. For example, since the navigation system stores map information of the road, it can provide the slope (gradient) and the curvature information of the road as well to aide in making sure the vehicle is maintained at the proper speed.

Next, the controller 50 controls each of the above components so that they can perform its function normally. Specifically, the controller 50 sets the speed corresponding to condition information of the road collected by the road information collector 40 and the area calculated by the image processor 30 as the driving speed of its vehicle, based on the table (hereinafter, referred to an area table) recoding the value (area) corresponding to the speed of the vehicle and the condition of the road.

For example, if the area corresponding to the condition is 100, the controller 50 controls a deceleration device 60 to decrease the speed of its vehicle if the calculated area is below 100. Conversely, if the area calculated by the image processor 30 is above 100, the controller 50 controls the acceleration device 70 to increase the speed of its vehicle. At this time, if the current speed of the vehicle does not exceed the SCC set speed, the vehicle is accelerated by the acceleration device 70.

As such, the controller 50 constantly maintains a distance from the preceding vehicle driving in the same lane by periodically performing the above described procedure. Further, the controller 50 obtains various information speed, etc.) of the vehicle in which it is installed through, e.g., a vehicle network. Such a vehicle network can include CAN (Controller Area Network), LIN (Local Interconnect Network), FlexRay, MOST (Media Oriented System Transport) and so forth.

Figure 3:
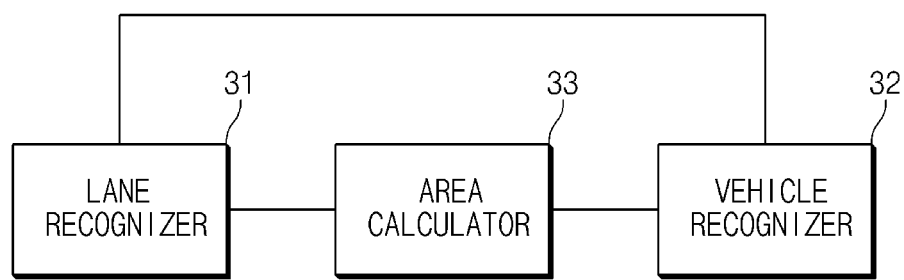
FIG. 3 is a detailed configuration diagram of an exemplary embodiment for an image processor according to the present invention.

FIG. 3 is a detailed configuration diagram of an exemplary embodiment for an image processor according to the present invention. As shown in FIG. 3, the image processor according to the present invention includes a lane recognizer 31, a vehicle recognizer 32, and an area calculator 33. First, the lane recognizer 31 recognizes the left/right lane line of the driving lane which its vehicle drives. The vehicle recognizer 32 recognizes the preceding vehicle on the driving lane recognized by the lane recognizer 31. At this time, it is desirable to reflect the speed limit of a road to the distance which the vehicle recognizer 32 can recognizes the preceding vehicle. The area calculator 33 calculates the trapezoid area consisting of the left/right lane line of the driving lane recognized by the lane recognizer 31 and the preceding vehicle recognized by the vehicle recognizer 32.

Figure 4:
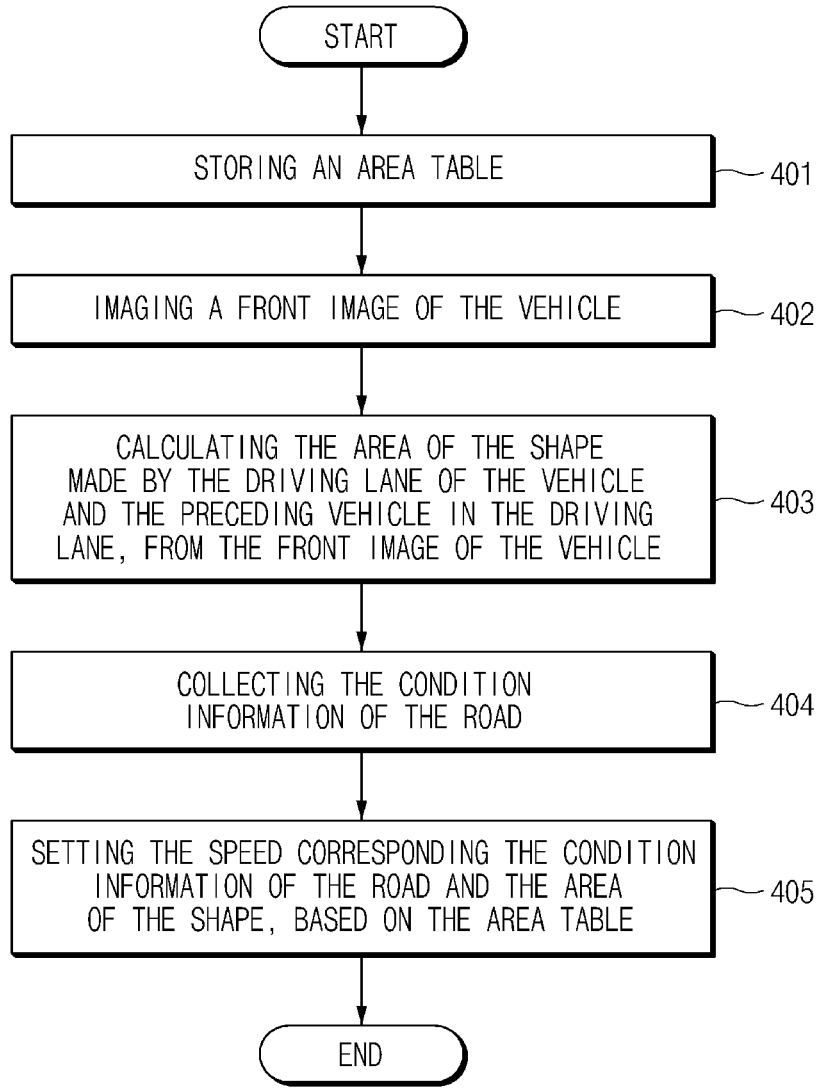
FIG. 4 is a flow chart of an exemplary embodiment for a vehicle speed control method using an image according to the present invention.

FIG. 4 is a flow chart of an exemplary embodiment for a vehicle speed control method using an image according to the present invention. First, the storage device 10 stores the table (hereinafter, referred to an area table) recording the area corresponding to the speed of the vehicle and the condition of the road (401). Then, the imaging device 20 takes an image of an area in front of the vehicle in which the imaging device is installed (402).

The image processor 30 then calculates the area of a shape made by the driving lane of the vehicle and the preceding vehicle in the driving lane from the image of an area in front of vehicle taken by the imaging device 20 (403). Subsequently, the road information collector 40 collects the condition information regarding the road (404).

Next, the controller 50 sets the speed corresponding to the condition information of the road collected by the road information collector 40 and the area calculated by the image processor 30 as the driving speed of the vehicle in which the system is installed, based on the area table (405). The distance from the preceding vehicle driving within the same lane is constantly maintained by periodically performing the above described procedure.

On the other hand, as described above, the method of the present invention can be made as a computer program. And, the code and code segment constituting the program can be easily inferred by a computer programmer in the art. Also, the made program is stored in a computer-readable recording media (information storage medium), and is read and executed by a computer, and thereby, the method of the present invention is implemented. And, the recording media includes all types of computer-readable recoding media.

As the above described, the present invention is not limited to the aforementioned embodiments and accompany drawings, since replacements, various modifications, and changes may be made without departing from the technical spirit of the present invention by those skilled in the art.

What is claimed is:

1. A vehicle speed control apparatus comprising:
    a storage device configured to store a table recording an area corresponding to a speed of a vehicle and a condition of a road;
    an imaging device configured to take an image of an area in front of the vehicle;
    an image processor configured to calculate an area of a shape made by a driving lane of the vehicle and a preceding vehicle in the driving lane from the image of an area in front of the vehicle taken by the imaging device;
    a road information collector configured to collect condition information regarding the road; and
    a controller configured to set a speed corresponding to the condition information collected by the road information collector and the area calculated by the image processor as a driving speed of the vehicle, based on the table.

2. A vehicle speed control apparatus according to claim 1, wherein the controller controls a deceleration device to decrease the speed of the vehicle when the area calculated by the image processor is less than a relevant area in the table.

3. A vehicle speed control apparatus according to claim 1, wherein the controller maintains a distance from the preceding vehicle driving within a same lane by periodically performing the driving speed set procedure of the vehicle.

4. A vehicle speed control apparatus according to claim 1, wherein the image processor calculates an area of a trapezoid in which a left lane line of the driving lane becomes a left side, a right lane line becomes a right side, a tangent line meeting the preceding vehicle and the driving lane becomes an upper side, and a bottom of the image of the area in front of the vehicle becomes a lower side.

5. A vehicle speed control apparatus according to claim 1, wherein the image processor comprises a lane recognizer configured to recognize a left/right lane line of the driving lane which the vehicle is driving in; a vehicle recognizer configured to recognize the preceding vehicle within the driving lane recognized by the lane recognizer; and an area calculator configured to calculate an area of a trapezoid consisting of the left/right lane lines of the driving lane recognized by the lane recognizer and the preceding vehicle recognized by the vehicle recognizer.

6. A vehicle speed control apparatus according to claim 1, wherein the road information collector collects gradient and curvature information of the driving road by communicating with a navigation system mounted within the vehicle.

7. A vehicle speed control method comprising steps of:
    storing a table recording an area corresponding to a speed of a vehicle and a condition of a road by a storage device;
    imaging an image of an area in front of the vehicle by an imaging device;
    calculating an area of a shape made by a driving lane in which the vehicle is traveling and a preceding vehicle in the driving lane from the image of the area in front of the vehicle taken by the imaging device, by an image processor;
    collecting condition information of the road by a road information collector; and setting a speed corresponding to the collected condition information of the road and the calculated area as a driving speed of the vehicle, based on the table by a controller.

8. A vehicle speed control method according to claim 7, wherein the step of setting a speed comprising steps of:
   comparing the calculated area and a relevant area in the table;
   decreasing the speed of the vehicle when the calculated area is less than the relevant area, as the result of the comparing;
   increasing the speed within SCC (Smart Cruise Control) set speed when the calculated area is greater than the relevant area, as the result of the comparing; and
   maintaining current speed when the calculated area is equal to the relevant area, as the result of the comparing.

9. A vehicle speed control method according to claim 7, wherein the method further comprises constantly maintaining a distance from the preceding vehicle driving within the same driving lane by periodically performing the driving speed set procedure of the vehicle.

10. A vehicle speed control method according to claim 7, wherein calculating the area of the shape includes calculating an area of a trapezoid in which a left lane line of the driving lane becomes a left side, a right lane line becomes a right side, a tangent line meeting the preceding vehicle and the driving lane becomes an upper side, and a bottom of the image of the area in front of the vehicle becomes a lower side.

11. A vehicle speed control method according to claim 7, wherein collecting condition information of the road includes collecting a gradient and a curvature of the driving lane by communicating with a navigation system mounted on the vehicle.

12. A non-transitory computer readable medium containing program instructions executed by a processor or controller, the computer readable medium comprising:
   program instructions that store a table recording an area corresponding to a speed of a vehicle and a condition of a road;
   program instructions that control an imaging device to take an image of an area in front of the vehicle;
   program instructions that calculate an area of a shape made by a driving lane in which the vehicle is traveling and a preceding vehicle in the driving lane from the image of the area in front of the vehicle taken by the imaging device;
   program instructions that collect condition information of the road; and
   program instructions that set a speed corresponding to the collected condition information of the road and the calculated area as a driving speed of the vehicle, based on the table.

13. A non-transitory computer readable medium according to claim 12, wherein the program instructions that set the speed include:
   program instructions that compare the calculated area and a relevant area in the table;
   program instructions that decrease the speed of the vehicle when the calculated area is less than the relevant area, as the result of the comparing;
   program instructions that increase the speed within SCC (Smart Cruise Control) set speed when the calculated area is greater than the relevant area, as the result of the comparing; and
   program instructions that maintain current speed when the calculated area is equal to the relevant area, as the result of the comparing.

14. A non-transitory computer readable medium according to claim 12 further comprising program instructions that constantly maintaining a distance from the preceding vehicle driving within the same driving lane by periodically performing the driving speed set procedure of the vehicle.

15. A non-transitory computer readable medium according to claim 12, wherein the program instructions that calculate the area of the shape includes program instructions that calculate an area of a trapezoid in which a left lane line of the driving lane becomes a left side, a right lane line becomes a right side, a tangent line meeting the preceding vehicle and the driving lane becomes an upper side, and a bottom of the image of the area in front of the vehicle becomes a lower side.

16. A non-transitory computer readable medium according to claim 12, wherein the program instructions that collect condition information of the road includes program instructions that collect a gradient and a curvature of the driving lane by communicating with a navigation system mounted on the vehicle.

* * * * *